UNITED STATES PATENT OFFICE.

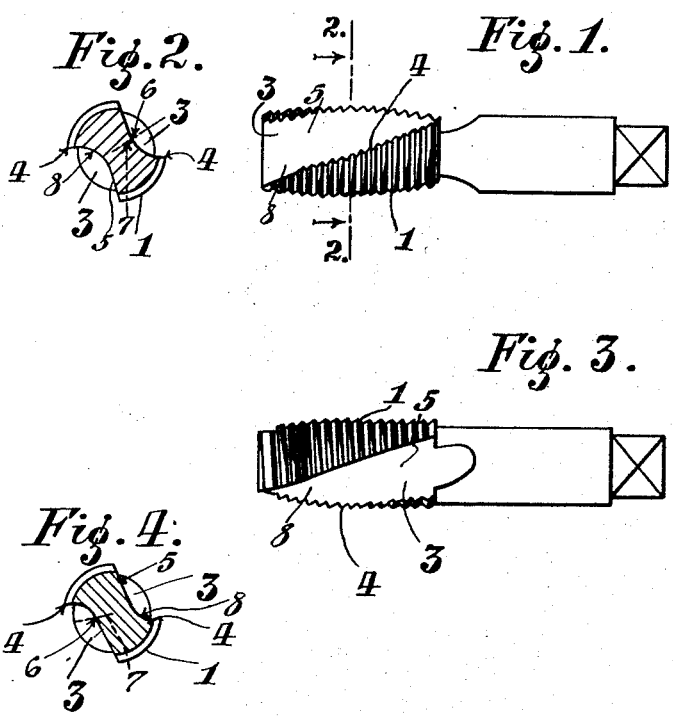

JOHN McFARLANE, OF BROOMHILL, AND DUNCAN CLELLAND, OF CLYDEBANK, GLASGOW, SCOTLAND.

SCREW-CUTTING TAP.

1,395,198.        Specification of Letters Patent.        Patented Oct. 25, 1921.

Application filed September 26, 1919. Serial No. 326,560.

*To all whom it may concern:*

Be it known that we, JOHN MCFARLANE and DUNCAN CLELLAND, both subjects of the King of Great Britain, and residing, respectively, at Broomhill, Glasgow, Scotland, and Clydebank, Glasgow, Scotland, have invented a certain new and useful Improved Screw-Cutting Tap, of which the following is a specification.

This invention relates to screw-cutting taps. In practice it has been found that, in removing shavings from metal with a cutting tool, each shaving is deflected from the work, at an angle depending upon the shape or formation of the tool adjacent to the cutting edge, and tends to conform first to a curve of comparatively large radius and subsequently, as it moves away from the cutting edge, to a curve of smaller radius. This change of form may be due to various reasons, such as variation of internal stresses or temper due to the successive increase and decrease of temperature caused by the heat generated by the cutting operation and subsequent radiation or transference of same to the atmosphere or lubricant or to mechanical changes due to the cutting or shearing action.

With screw-cutting taps as at present constructed the shape of the flutes is such that the shavings or cuttings, on leaving the cutting edges, are forced against the leading faces before they have assumed their final formation and are either broken or constrained to a formation other than they would have naturally assumed, resulting, in either case, in choking of the flutes and consequent jamming of the tap.

The object of the present invention is to devise a screw cutting tap which shall permit the shavings or cuttings formed thereby to assume their natural or unrestrained formation and then guide same clear of the cutting tool.

To the attainment of this end the invention consists in substantially so shaping each flute that, in cross section, the leading face constitutes a tangent to the curved portion of the flute adjacent the cutting edge, hereinafter referred to as the following face at a point where said latter meets a line joining the center curvature thereof with the center of the tap or at a point intermediate said point of junction and the cutting edge.

It will, of course, be obvious that slight deviations from this form are possible without departing from the scope of the invention or materially affecting the operation of the tap. For instance the following face may not be truly arcuate in section or may even be straight while the leading face may not be an exact tangent but may vary or even curve slightly to one side or other of the true tangent provided it substantially conforms thereto. Such and other modifications which may reasonably be said to fall substantially within the statement of invention are intended to fall also within the scope of the subsequent claims. In order to guide the shavings or cuttings forward clear of the cutting tool the flutes may, in known manner, be cut spirally in a direction contrary to the thread of the tap. That is to say, a tap for cutting right hand screw threads may have left hand spiral flutes and vice versa.

In order that the invention may be clearly understood two forms or embodiments thereof are illustrated, by way of example, on the accompanying drawing, whereon:—

Figure 1 is a side elevation, Fig. 2 a section on the line 2—2, Fig. 1, Fig. 3 a side elevation at right angles to Fig. 1 and Fig. 4 a view, corresponding to Fig. 2, of a tap suitable for tapping soft metals, such as copper or aluminium.

Referring to the drawings, the tap 1 having a right hand screw thread is formed with two left hand spiral flutes 3, 3. These flutes are each so formed that in cross section, (Figs. 2 and 4 the leading face 5 constitutes a tangent to the following face 8 at a point 6 where the following face meets a line 7 joining the center of curvature thereof with the center of the tap. The leading face 4 may merge, at a tangent, into the following face 8 at any point intermediate the point 6 and the cutting edge 4 but the curve 8 must not extend beyond the point 6.

The spiral flutes 3 in the tap are, preferably, cut by means of a rotary milling cutter suitably carried in such a position that the said cutter rotates in a plane set at an angle to the axis of the tap so as to give the desired pitch to the spiral flutes and the cutter is also set to one side of the axis of the tap in such a manner that only the true peripheral edge of the cutter is employed in cutting that side of the spiral flute which forms the following face and cutting edge of the tap while the leading or opposite face of the flute is cut by the side of the cutter.

Having now fully described our invention, what we claim and desire to secure by Letters Patent is:—

1. A screw-cutting tap having a plurality of spiral flutes, the leading face of each of which constitutes, in cross section, substantially a tangent to the following face at a point where the latter meets a line joining the center of curvature thereof with the center of the tap, substantially as described.

2. A screw-cutting tap having a plurality of spiral flutes cut in a direction contrary to the thread of the tap, the leading face of each flute constituting in cross section, a tangent to the following face at a point where the latter meets a line joining the center of curvature thereof with the center of the tap, substantially as described.

In testimony whereof we affix our signatures in presence of two witnesses.

JOHN McFARLANE.
DUNCAN CLELLAND.

Witnesses:
WILLIAM GALL,
MARY A. LINDSAY.